US012296334B2

(12) United States Patent
Horton et al.

(10) Patent No.: US 12,296,334 B2
(45) Date of Patent: May 13, 2025

(54) MICROFLUIDIC DEVICES AND ARRANGEMENTS FOR SUPPLYING SUCH DEVICES WITH REAGENTS AND BIOLOGICAL SAMPLES

(71) Applicant: Global Life Sciences Solutions Operations UK Ltd, Sheffield (GB)

(72) Inventors: Jeffrey Kenneth Horton, Cardiff (GB); Simon Laurence John Stubbs, Cardiff (GB); Peter James Tatnell, Cardiff (GB); Geraint Seymour, Cardiff (GB); Cheryl Louise Potts, Cardiff (GB); Alan Stuart Pierce, Cardiff (GB); David Powell, Cardiff (GB); Alison Myfanwy Wakefield, Cardiff (GB)

(73) Assignee: GLOBAL LIFE SCIENCES SOLUTIONS OPERATIONS UK LTD, Sheffield (GB)

( * ) Notice: Subject to any disclaimer, the term of this patent is extended or adjusted under 35 U.S.C. 154(b) by 482 days.

(21) Appl. No.: 15/030,994

(22) PCT Filed: Oct. 8, 2014

(86) PCT No.: PCT/EP2014/071581
§ 371 (c)(1),
(2) Date: Apr. 21, 2016

(87) PCT Pub. No.: WO2015/058958
PCT Pub. Date: Apr. 30, 2015

(65) Prior Publication Data
US 2016/0303562 A1 Oct. 20, 2016

(30) Foreign Application Priority Data
Oct. 24, 2013 (GB) ..................................... 1318814

(51) Int. Cl.
*B01L 3/00* (2006.01)

(52) U.S. Cl.
CPC ........... *B01L 3/502715* (2013.01); *B01L 3/52* (2013.01); *B01L 2200/025* (2013.01);
(Continued)

(58) Field of Classification Search
CPC .. B01L 3/502715; B01L 3/52; B01L 2300/16; B01L 2200/10; B01L 2300/12;
(Continued)

(56) References Cited

U.S. PATENT DOCUMENTS 5,508,200 A * 4/1996 Tiffany ............ G01N 35/00009 436/166
5,976,813 A 11/1999 Beutel et al.
(Continued)

FOREIGN PATENT DOCUMENTS

WO 2013/144743 A1 10/2013

OTHER PUBLICATIONS

Begolo et al. (Lab Chip, 2013, 13, 4331 Published Sep. 17, 2013) (Year: 2013).*
(Continued)

*Primary Examiner* — P. Kathryn Wright
*Assistant Examiner* — Curtis A Thompson
(74) *Attorney, Agent, or Firm* — Eversheds-Sutherland (US) LLP

(57) ABSTRACT

Disclosed is a microfluidic device including a reagent supply apparatus comprising: a solid support 12 formed preferably from cellulose fibrous material having a porosity which allows liquid flow through the material; at least one generally dry reagent 16 stored on a surface of the support at a regent location or locations; the support further being suitable for storing biological sample material 17 in a dry state at a sample location or locations, spaced from the reagent location or locations.

20 Claims, 5 Drawing Sheets

(52) U.S. Cl.
CPC ..... *B01L 2200/027* (2013.01); *B01L 2200/10* (2013.01); *B01L 2200/16* (2013.01); *B01L 2300/069* (2013.01); *B01L 2300/0803* (2013.01); *B01L 2300/0816* (2013.01); *B01L 2300/12* (2013.01); *B01L 2300/126* (2013.01); *B01L 2300/16* (2013.01)

(58) Field of Classification Search
CPC ......... B01L 2200/025; B01L 2300/126; B01L 2300/0816; B01L 2300/0803; B01L 2300/069; B01L 2200/16; B01L 2200/027
See application file for complete search history.

(56) References Cited

U.S. PATENT DOCUMENTS

| | | | | |
|---|---|---|---|---|
| 6,905,816 | B2 | 6/2005 | Jacobs et al. | |
| 8,685,749 | B2 | 4/2014 | Shoemaker et al. | |
| 9,482,603 | B2 | 11/2016 | Brousmiche et al. | |
| 9,534,990 | B2 | 1/2017 | Smith et al. | |
| 9,808,798 | B2 | 11/2017 | Ismagilov et al. | |
| 2004/0014239 | A1* | 1/2004 | Wolk | B01J 19/0046 436/180 |
| 2005/0214934 | A1* | 9/2005 | Sawa | B01L 3/508 435/287.2 |
| 2008/0248590 | A1 | 10/2008 | Gullisken et al. | |
| 2009/0186357 | A1* | 7/2009 | Mauk | B01L 3/5027 435/6.15 |
| 2011/0008909 | A1 | 1/2011 | Homrig et al. | |
| 2011/0129940 | A1 | 6/2011 | Gijlers et al. | |
| 2011/0268630 | A1 | 11/2011 | Williams et al. | |
| 2012/0040470 | A1 | 2/2012 | Dorn et al. | |
| 2012/0094276 | A1 | 4/2012 | Buchanan | |
| 2012/0125127 | A1 | 5/2012 | Loppacher et al. | |
| 2012/0156112 | A1 | 6/2012 | Sprague et al. | |
| 2013/0164856 | A1 | 6/2013 | Jebrail et al. | |
| 2014/0127669 | A1* | 5/2014 | Hilder | B01J 20/28054 435/2 |
| 2015/0027894 | A1* | 1/2015 | Puleo | B01D 57/02 204/627 |

OTHER PUBLICATIONS

Aveyard et al. (Chem Commun., 2007, 4251-4253 (Year: 2007).*

Ramachandran et al. (Diagnostics, vol. 3 No. 2, Apr. 2, 2013 (Apr. 2, 2013), pp. 244-260) (Year: 2013).*

Lopez et al. J. Micromech. Microeng. 23 025012 (Year: 2013).*

GE Healthcare, "FTA™ Cards Collect, archive, transport, and purify nucleic acids all at room temperature", Dec. 2009, Data File 51613, https://schiller.com.ec/pdf/cytiva/productos/FTA%20Cards%20Data%20Sheet%20GENERAL.pdf (Year: 2009).*

Jebrail et al, "A digital microfluidic method for dried blood spot analysis," Lab on a Chip, vol. 11, No. 19, Jan. 1, 2011, 8 pages.

International Search Report and Written Opinion regarding International Application No. PCT/EP2014/071581, mail date Jan. 26, 2015, 10 pages.

Japanese Office Action for JP Application No. 2016-525003 mailed Aug. 7, 2018 (6 pages).

European Office Action for EP Application No. 14781250.7 mailed Mar. 28, 2018 (9 pages).

Fridley et al., "Controlled Release of Dry Reagents in Porous Media for Tunable Temporal and Spatial Distribution Upon Rehydration," Lab Chip, 2012, 12(21):4321-4327.

European Office Action for EP Application No. 14781250.7 mailed Feb. 6, 2019 (8 pages).

Ramachandran et al., "A Rapid, Multiplexed, High-Throughput Flow-Through Membrane Immunoassay: A Convenient Alternative to ELISA," Diagnostics, 2013, 3:244-260.

Japanese Office Action for JP Application No. 2016-525003 mailed Mar. 5, 2019 (6 pages, with English translation).

Begolo, Stefano, Feng Shen, and Rustem F. Ismagilov. "A microfluidic device for dry sample preservation in remote settings." Lab on a Chip 13.22 (2013): 4331-4342. Available at: http://pubs.rsc.org/en/content/articlehtml/2013/lc/c3lc50747e. Published online Sep. 17, 2013.

* cited by examiner

MICROFLUIDIC DEVICES AND ARRANGEMENTS FOR SUPPLYING SUCH DEVICES WITH REAGENTS AND BIOLOGICAL SAMPLES

CROSS-REFERENCE TO RELATED APPLICATIONS

This application is a filing under 35 U.S.C. 371 of international application number PCT/EP2014/071581, filed Oct. 8, 2014, which claims priority to Great Britain application number GB 1318814.9, filed Oct. 24, 2013, the entire disclosures of each of which are hereby incorporated by reference.

This invention relates to microfluidic devices and arrangements for supplying such devices with reagents, and/or biological samples. In particular, but not exclusively, the invention is employable in molecular and biochemical assays, biological cell culturing, or other technologies which require microfluidics and reliable reagent supply, for example applications for miniaturised tab on a chip' technologies which may be based around so called electrowetting or other microfluidic microchips, and stabilised reagent chemistries for supplying such technologies.

In this specification, 'reagent' means any material that is used to perform an assay or that facilitates an assay. The term reagent also encompasses constituent reagent materials that are combined, or reacted to form a reagent, and materials which stabilise samples.

Commercially available microfluidic devices typically have areas from 1 $mm^2$ to 10 $cm^2$ and are typically a few millimetres in thickness. Usually, such devices have a two-dimensional structure, but in some instances may be in three dimensions, including plural layers. The devices may be designed to contain a number of chambers which may be interconnected by either channels, tubes or zones apply electrostatic forces to transfer small amounts of fluid by a process known as electrowetting, wherein fluids are moved around. Different assay stages are performed at different locations on the device. Internal volumes of liquids required depend on the cross-section and geometry of the particular structures but are usually in the nanolitre to microlitre range. The microfluidic devices may be fabricated from, for example, silicon, glass or different types of plastic e.g. polydimethyl siloxene (PDMS) or polymethylmethacrylate, or if designed without electrowetting, may involve the use of other known techniques including etching, hot embossing, wire imprinting, wax channel generation, reactive ion etching or laser ablation.

Other commercially available microfluidic devices include so called bioelectronic chips, which have an interface between biomolecules and non-biomolecule materials resulting in fluid transfer or movement of a droplet or modulation of the signal from the biomolecule to the device, wherein the sample can be moved electronically or amplified electrically. These bioelectronics chip devices contain built in electrical components or sit on electrical circuitry or PCB boards in combination with the fluidic elements. The electrical components (e.g. electrodes) are located within or below the device (e.g. within or below a micro chamber) and are used to manipulate a fluid or the components of fluid within the chamber or on the surface of the device.

The microfluidic devices mentioned above have the advantage that they can be employed by untrained staff, and in regions of the world where there are no laboratories. Usually a result can be obtained with little analytical skill.

However, the need to supply the devices mentioned above, and like devices, with reagents or biological samples has not been well considered to date. The use of untrained staff brings with it the risk of contamination of the reagents used, so an easy to use reagent and sample supply system is required. This problem has been addressed using sealed liquid reagent cassettes. However, such cassettes add to the overall cost of each assay, and the cost of the initial device because a mechanical means to puncture the seals is required. Where multiple biological samples are collected, then using a sealed supply container for each sample is not practical because samples are usually collected in the field, or at a clinic, and so sealing them correctly is difficult. Thus, a separate biological sample supply step is needed too. In addition, in hot climates the cooling of temperature sensitive reagents prior to their supply to a microfluidic device is problematic, particularly where no electricity is available.

Since it is possible to produce generic devices which can perform different tasks, simply by controlling the device in the correct manner, then it should be possible to produce relatively low cost multipurpose devices. However, then, each range of devices will need different reagents. If the reagents are required to perform an assay on a particular sample, then the sample too has to be introduced with the correct reagents to the device. So what should be a relatively low cost device can become more costly when the necessary customised supply hardware is included.

As an example, if a microfluidic device is to be used to detect different diseases based on the genetic signature of a blood sample, by means of a polymerase chain reaction (PCR) then different oligonucleotide primers will be required to perform the different detections. What is needed is a simple way to supply a number of different primers and as well as supplying a biological sample, that will be adequate for each detection. Conventionally, that would need a costly cassette based sealed liquid system which may need to be kept cool and would have a limited shelf life, plus the addition of a blood sample to be added to a cassette then sealed or otherwise preserved.

The inventors of the present invention have recognised the need for a very simple and low cost means for supplying reagents and samples to a microfluidic device, and have, in embodiments, addressed that need.

According to a first aspect, the invention provides reagent and biological sample supply apparatus for supplying a microfluidic device, the apparatus comprising: a solid support formed from a material being generally non-soluble, but having a porosity which allows liquid flow through the material; at least one generally dry reagent stored on a surface of the support at a regent location or locations; the support further being suitable for storing biological sample material in a dry state at a sample location or locations, spaced from the reagent location or locations.

In an embodiment, the solid support is fibrous, for example a cellulose fibre material, or a glass fibre/microfibre material.

Alternatively, the solid support is a porous polymer, for example porous membrane material such as polyester, polyether sulfone (PES), polyamide (Nylon), polypropylene, polytetrafluoroethylene (PTFE), polycarbonate, cellulose nitrate, cellulose acetate, aluminium oxide, or a polysaccharide such as an alignate, cellulose or modified cellulose.

In an embodiment, the support is generally planar and includes a peripheral supporting frame, for example formed from card or plastics sheet, thereby forming a sample and reagent mount, for example a flat rectilinear formation or a rotatable disk, optionally having at least one depression or dimple formed in the planar material, for example formed by embossing.

In an embodiment, the support includes multiple locations, arranged as an orthogonal matrix, or a circular array, for example arranged to be brought sequentially into alignment with a cooperating part of a device, for example by rotation, thereby allowing multiple assay performances.

In an embodiment, the reagent(s) are deposited on the support in a solution, or carried in a liquid excipient, optionally applied by spotting or overlaying, and then dried in situ, or alternatively, pre-dried reagents are applied to the support, optionally held in place using adhesive, such as polyvinyl alcohol (PVA) adhesive.

Preferably, reagents in solution are lyophilised, for example in the presence of suitable sugars, for example dextrose, lactose, or proteins.

In an embodiment, the support surface is impregnated with chemicals, said chemicals including a weak base, a chelating agent, an anionic surfactant, and/or a chaotropic agent.

In an embodiment, the support is coated with one or more materials to enhance recovery of biological sample material and/or reagent and said one or more materials to enhance recovery include: Poly-2-ethyl-2-oxazoline (PeOX); Polyvinyl pyrolodine (PVP); Polyvinyl pyrolodine plus non-ionic detergent for example Polysorbate 20; Polyvinyl pyrolodine plus albumin; Poly vinyl alcohol (PVA); PeOX plus non-ionic detergent; Polyethylenemine (PEI) plus albumin; non-ionic detergent plus albumin.

In an embodiment, the support includes a biological sample comprising or consisting of i) endogenous moieties; ii) biopharmaceutical or biotech drugs or other pharmaceutical agents; (iii) nucleic acids; (iv) peptides, proteins or antibodies; or v) cells or tissue.

In an embodiment, the support includes a biological sample comprising or consisting of dried: blood; blood plasma, or other blood components; urine; cerebral culture media; cell samples; cell culture; or tissue exudate.

According to a second aspect, the invention provides microfluidic device including a reagent supply apparatus according to the first aspect or embodiments thereof for cooperating with the device, said reagent supply apparatus holding at least one dry reagent at a first location, and dry biological sample material(s) at a second location separate from the first location.

In an embodiment, the microfluidic device includes a liquid dispenser for dissolving the dry reagent(s) and further includes a liquid transporter for transporting the dissolved reagents(s) from said support to said device, and optionally the device further includes a fluid processing zone having fluid receiving areas for receiving the dissolved reagent(s), said fluid receiving areas being in electrical communication with electrical components of the device, and having electrical connections for connecting the device to an electronic controller or monitor.

According to a third aspect, the invention provides a microfluidic device, a first mount carrying at least one reagent in a substantially dry form, and second mount suitable for dry storing a biological sample, wherein the microfluidic device includes first and second mount receiving areas, and a liquid path from the areas to liquid a processing area.

According to a fourth aspect, the invention provides an assay method including the following steps in any suitable order:

a) depositing at least one reagent onto a first solid support and drying said reagent if said reagent is not in a dry form;
b) depositing a biological sample onto either the first solid support or a discreet further second solid support;
c) providing a microfluidic device, having at least one receiving area for receiving the or each solid support;
d) dissolving or eluting said sample and the or each reagent; and
e) processing said dissolved or eluted sample and reagent by following a predetermined assay, optionally as described in any one of the assays 1) to 6) listed on page 16.
f) optionally, performing step e) with the assistance of further reagents housed within the microfluidic device.

The invention extends to a reagent supply apparatus, a microfluidic device, a combination, or an assay method substantially as described herein optionally with reference to the drawings.

The invention can be put into effect in numerous ways. By way of example, embodiments are described below, with examples only being illustrated in the drawings, wherein, FIG. 1 shows a pictorial view of apparatus and a device according to the invention;

Figure 1:
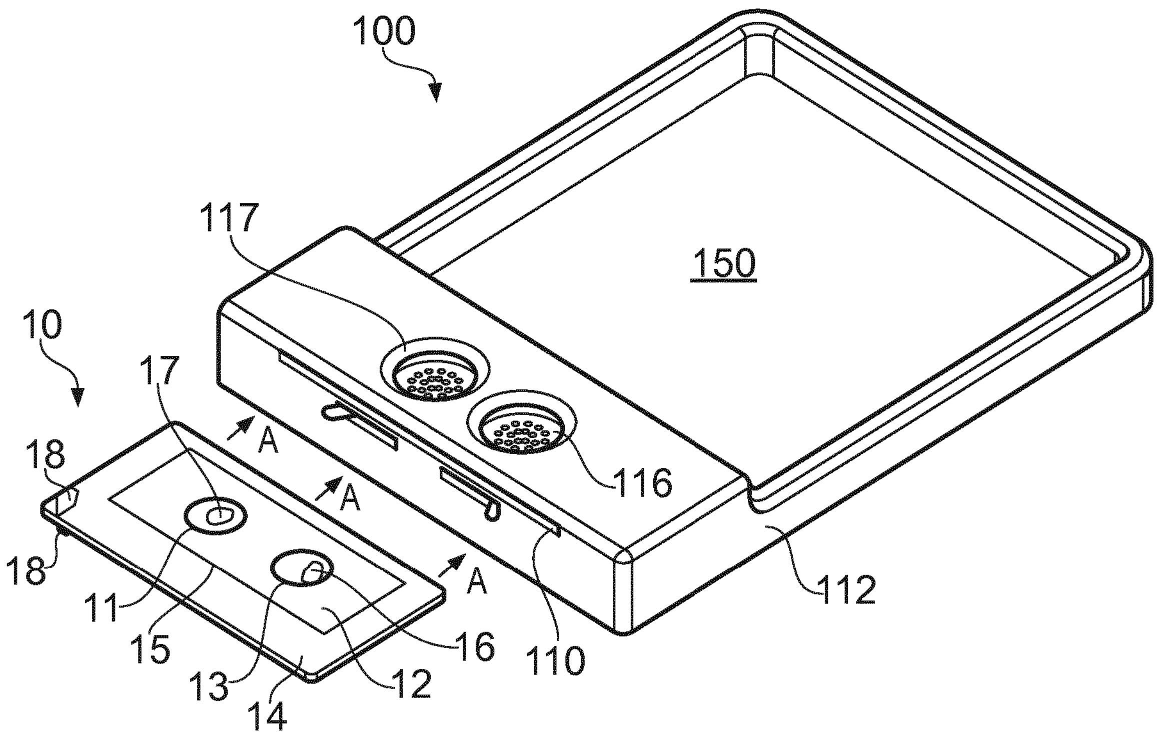

Referring to FIG. 1 there is shown apparatus in the form of a mount 10 which includes a solid cellulose paper support 12, having a surrounding peripheral strengthening frame 14 formed from stiff card. The frame 14 has an opening 15 in which exposes the support 12 and allow reagents for biochemical assays 16, for example an enzyme to be deposited on the support at a reagent location 13 which, for convenience is marked on the support 12, for example in the form of a slurry which is subsequently freeze dried. Other methods of applying a reagent and given below.

Whilst not essential, the apparatus includes a peel-off film 18, which is applied to both sides of the support 12 after the reagent is dried on the support.

In use, the film 18 is removed just before a sample 17 is applied to the mount 10 at a sample location 11. This sample is for example: a dried blood spot, blood plasma, urine, a cerebral culture media, cell cultures, tissue exudates and the like, containing an analyte, for example nucleic acid, a biopharmaceutical drug or drug metabolite.

The mount 10 with films 18 removed, and sample applied, possibly after a long period of storage (possibly years), is fed in the direction of arrows A into a microfluidic device 100, via a slot 110, in a body portion 112 of the device 100. The device in this instance is capable of manipulating fluids by electrostatic charge as described above at a fluid processing area 150.

The mount 10 once within the body 112, is exposed only at the locations 11 and 13 which then coincide with openings 116 and 117 respectively, in the body 112.

Figure 2:
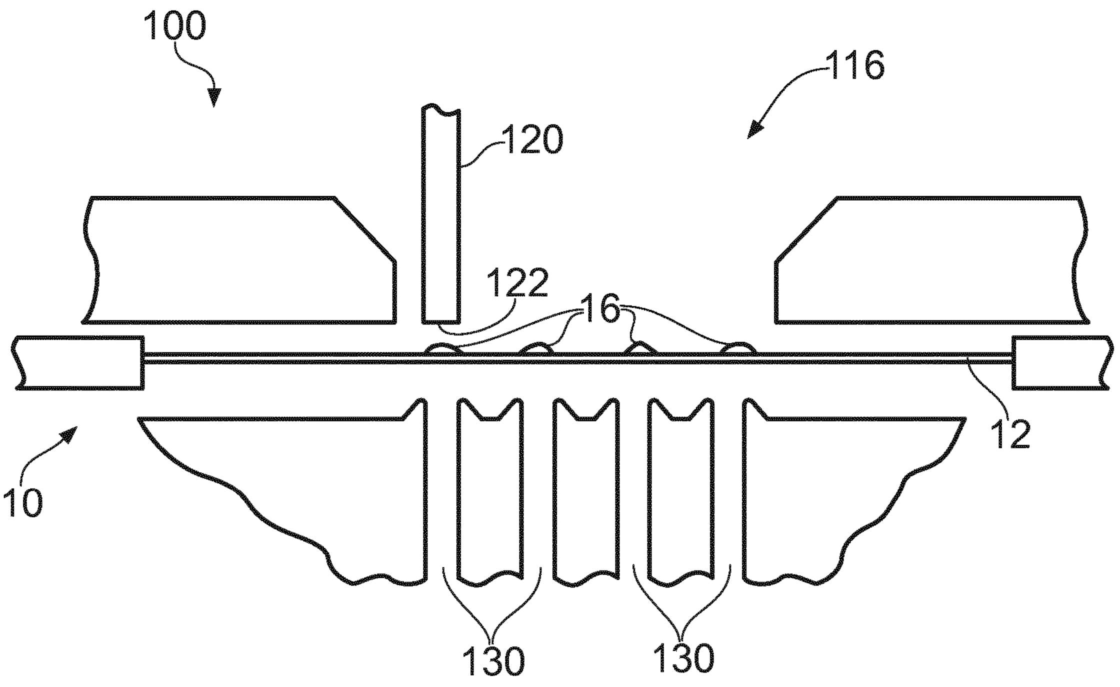
FIG. 2 shows an enlarged sectional view of part of the apparatus and device shown in FIG. 1.

Referring additionally to FIG. 2, there is shown a partial sectional view of the device 100 with the mount 10 inserted therein. In this view the opening 116 is shown in section which exposes the reagent 16 on the support 12. In this case individual aliquots of the reagent 16 have been deposited on the support, so that, if needed different reagents can be used, or multiple assays can be employed. Shown in FIG. 2 is a pipetting nozzle 120, having a liquid dispensing end 122.

Also shown in this Figure are an array of inlets 130, each of which are in fluid communication with the fluid processing area 150 shown in FIG. 1.

The nozzle 120 is moveable vertically so that its end 122 is adjacent or in contact with the support 12 or reagent 16. Solvent flows from the nozzle to dissolve or suspend the reagent, so that the reagent flows through the support and into a respective inlet 130, whereafter it is transported to a prescribed part of the fluid processing area 150. The nozzle 120 can be moved horizontally to overly the remaining inlets 130 in turn, and the liquid dispensing step described above can then be repeated for each inlet 130, if needed.

In practise, the same operation will take place for the biological sample 17, and the same arrangements as shown in FIG. 2 can be used, except that the sample 17 is removed from the support 12, rather than the reagent 16.

Figure 3:
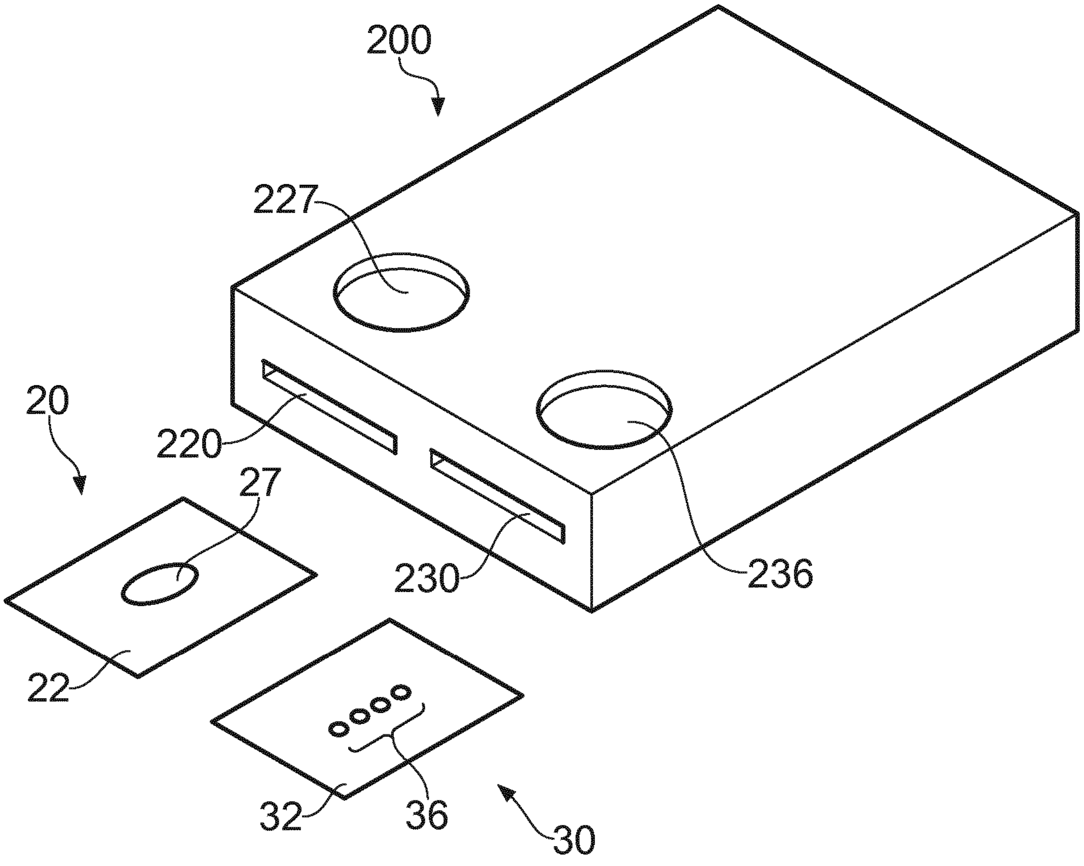
FIG. 3 shows a modified apparatus and a modified device.

FIG. 3 shows a modified design of apparatus 20 and 30 and device 200. The apparatus 20 and 30 consist of two discrete mounts 22 and 32. Mount 20 is used to collect a biological sample 27, and mount 30 supports reagent aliquots 36 in separate areas. The mounts are, as described above formed from fibrous material, and has embossed wells to hold the aliquots of reagents 36 in place. The Mounts 20 and 30 are inserted into slots 220 and 230 respectively, for processing in the same manner as described above, including the addition of liquids with openings 227 and 236 respectively. This arrangement has the benefit that a sample can be collected and transported separately to the reagents, which allows use of more environmentally sensitive reagents.

Two embodiments of the apparatus only are illustrated and described above, however it will be readily apparent that numerous modification, additions, or omissions could be made, with departing from the scope of the invention defined herein. For example, the nozzle 120 described could be omitted and a manually operable pipet or other fluid applicator could be used instead. There is no need for openings 117,116, 227 and 236 where automatic liquid application is provided. Where a moveable nozzle is employed, it is intended that the nozzle be moveable horizontally in a predetermined pattern to match the pattern of reagent deposits, however, the nozzle may be static and the support may be moveable, for example in a pattern. The reagent and sample are in intended to be applied to the surface of the support 12 that faces upwards in use, because the support will act as a filter to remove larger particles as liquid is forced through the support by fluid pressure, although the dissolving liquid may be drawn downwardly by gravity or negative pressure on the underside of the inlets 130. However, the sample and/or reagent could be applied to the surface which faces downwardly in use, with satisfactory results.

Although reagents are intended to be stored in a substantially dry state on a support, further reagents, for example those which are common or generic to a plurality of assays may additionally be stored within the microfluidic device, for example at fluid processing area 150.

EXAMPLES OF USE

Example 1

Recovery of Nucleic Acids from a Cellulose Fibre Support Treated, for Example, FTA In this example a known microfluidic device is preprogrammed to function to recover nucleic acids from a biological sample and to amplify them for the purpose of electrophoretic separation of certain of the acids for identification purposes. Known PCR reagents (including polymerase, primers, dNTPs (deoxy-nucleotide-tri phosphates; these are deoxyribonucleotide monomers or single units of DNA which are used by a DNA polymerase as nucleotides to add to the DNA strand during the PCR reaction and replication) and standards (DNA standards to calibrate the reaction on the device)) are applied to a cellulose fibre support and dried according to known techniques. A biological sample, for example a blood sample from an individual was applied to the support, and allowed to dry. In order to verify the procedure above, an experiment was carried to amplify DNA directly from the solid cellulose support matrix (using supports sold under the brand name 'FTA cards'; GE Healthcare, catalogue code WB120205). So called DNA profiling is based on a PCR which uses short tandem repeats (STR), which are short repeating sequences of base pairs of DNA. This method uses highly polymorphic regions that have short repeated sequences of DNA (the most common is 4 bases repeated), because unrelated people almost certainly have different numbers of repeat units, STRs can be used to discriminate between unrelated individuals. These STR loci (locations on a chromosome) are targeted with sequence-specific primers and amplified using PCR. The DNA fragments that result are then separated and detected using capillary electrophoresis. Thus, STR loci consist of short, repetitive sequence elements 3-7 base pairs in length. These repeats are well distributed throughout the human genome and are a rich source of highly polymorphic markers, which may be detected using PCR. Alleles of STR loci are differentiated by the number of copies of the repeat sequence contained within the amplified region and are distinguished from one another using fluorescence detection following electrophoretic separation.

In this example, FTA micro cards were spotted with blood obtained from Tissue Solutions Ltd who supplied blood from a single source from an anonymous donor. 75 μl of blood was applied to sixty FTA microcards and allowed to dry for at least 2 hours before storing in a desiccator.

DNA profiling was carried out using the Powerplex 16HS System (catalogue code, DC2101, Promega, Southampton, UK). The Powerplex 16HS system recommends that FTA materials are washed to avoid inhibition so manufacturer's instructions were followed, and DNA was eluted from its support prior to analysis. The PowerPlex® 16 HS System is a multiplex STR system for use in DNA typing. This system co-amplifies the loci D18S51, D21 S11, TH01, D3S1358, Penta E (labeled with fluorescein); FGA, TPDX, D8S1179, vWA and Amelogenin (labelled with TMR); CSF1PO, D16S539, D7S820, D13S317, D5S818 and Penta D (labeled with JOE). This multiplex includes all 13 CODIS STR markers, Amelogenin for gender determination and two low-stutter, highly discriminating pentanucleotide STR markers. All sixteen loci were amplified simultaneously in a single tube and were analyzed in a single injection.

The Powerplex 16HS provided all materials necessary to amplify STR regions of human genomic DNA, including a thermostable DNA polymerase, master mix and primers and this kit was used to amplify DNA from 1.2 mm diameter samples taken from the FTA cards. DNA was eluted from the supporting material using FTA Purification Reagent (GE Healthcare catalogue code WB120204) and rinsed with $TE^{-1}$ (10 mM Tris-HCl, 0.1 mM EDTA, pH 8) buffer following the manufacturer's instructions for the purification reagent.

Figure 4:
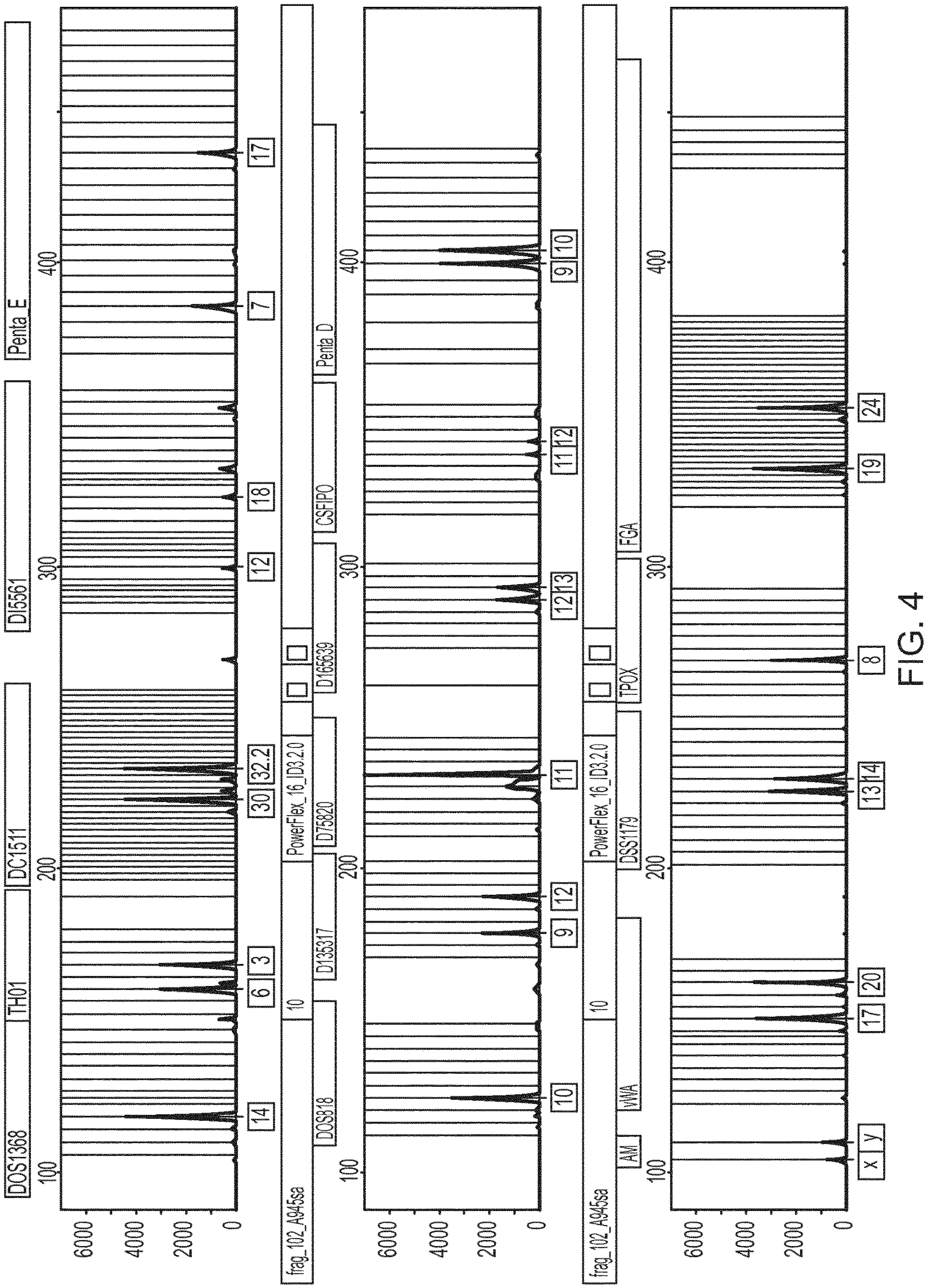
FIG. 4 shows the results of DNA recovery experiments.

The STR analysis procedure was carried out exactly as outlined in the PowerPlex 16HS System instruction booklet. Thermal Cycling conditions over 28 cycles were as follows:

i. 95° C. for 2 minute;
ii. 94° C. for 5 seconds;
iii. 58° C. for 15 seconds;
iv. 72° C. for 10 seconds for 28 cycles;
i. 72° C. for 7 minutes;
ii. 4° C. hold The resulting PCR products were analysed on an ABI™ 3130x1 Genetic Analyzer capillary electrophoresis system with GeneMapper™ v3.2 software (Life Technologies, Paisley, UK). The STR profiles generated from the supporting material were taken and sample results were compared. The results of DNA amplification and DNA profiling from the FTA supports are shown in FIG. 4. Thus it can be demonstrated that full DNA STR profiles were obtained from the FTA paper using known techniques which can readily repeated in microfluidic devices. The results show that DNA may be stored, recovered and amplified from this cellulose matrix, indicating that FTA may be used as a sample or reagent storage medium for the device outlined in this specification.

Example 2

Recovery of DNA from FTA Elute Cellulose Matrix

Normal human blood or HeLa cells ($1\times10^7$ cells/ml) (65 μl) were applied to a cellulose paper support with an indicating dye to show where samples have been placed, for example paper sold under the brand name 'Indicating FTA elute cards (GE Healthcare catalogue code: WB120412) and were allowed to dry. DNA was eluted from the cards at 95° C. for 30 minutes on a heating block to mimic the heating used in a microfluidic device.

Figure 5:
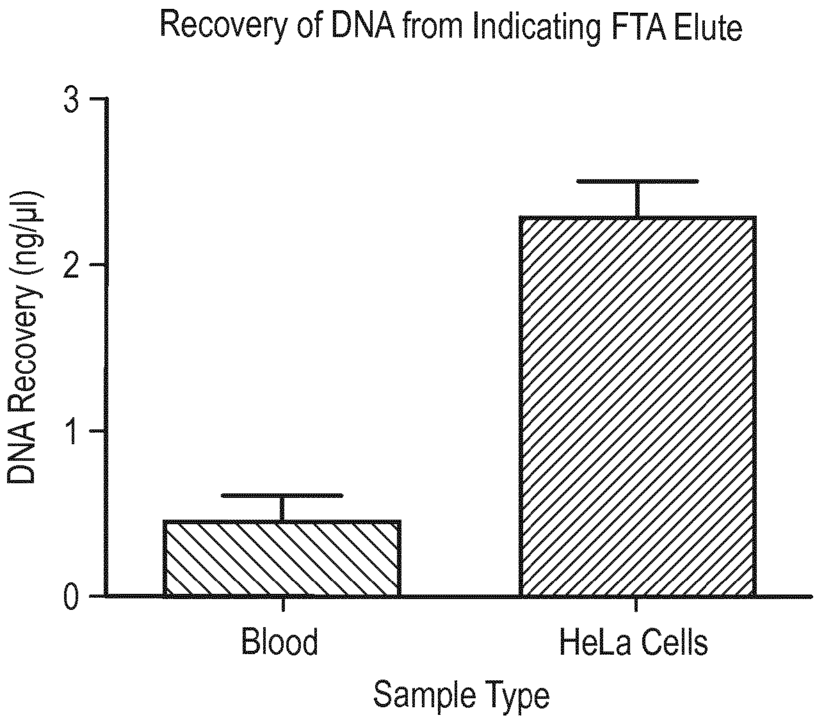
FIG. 5 shows the results of further recovery experiments.

TaqMan RNase P Detection Reagents Kit (Lab Technologies Catalog code 4316831) were used to quantify human gDNA levels. This kit was used following the manufacturer's instructions on an Applied Biosystems 7900 Real-Time PCR System. Thermal Cycling conditions over 40 cycles were as follows:

i. 50° C. for 2 mins;
ii. 95° C. for 10 mins;
iii. 95° C. for 15 secs;
iv. 60° C. for 1 min;
v. Repeat steps iii & iv 39 times (i.e., 40 cycles in total)
vi. 4° C. hold Data was automatically acquired. Standard curves consisted of 0.01-10 ng/μl human genomic DNA. The recovery rates for this experiment are shown in FIG. 5.

Again, this demonstrates that gDNA can be obtained using a sample held on a cellulose substrate, and recovered using procedures that can be repeated in microfluidic devices.

Example 3

Recovery of Enzymes

Enzyme recovery testing was carried out with fully configured DNase and RNase Contamination Kits (DNase & RNase Alert QC Systems, catalogue codes AM1970 & AM1966, Life Technologies) according to manufacturer's instructions.

In a first series of experiments 0.5 U of DNase or RNase was applied to a plain untreated cellulose paper sold under the trade name '903 paper' by Whatman Inc in 10 μl volumes. DNAse and RNase activity was measured as outlined in Table 1 below.

In a second series of experiments, 1.2 mm diameter samples were taken from $10^6$ human embryonic stem cells (GE Healthcare; cell line ref: WCB307 GEHC 28) which had been applied to 903 paper in 10 μl volumes as above. DNAse and RNase activity was measured as outlined below.

In a third series of experiments, 1.2 mm diameter samples were taken from approximately $10^6$ human embryonic stem cells (GE Healthcare; cell line ref: WCB307 GEHC 28) containing either 0.5 U of DNase or 10 μU of RNase added to these cells. These samples were applied to 903 paper in 10 μl volumes.

Detection of DNase was carried out using a cleavable fluorescent-labelled DNase substrate. Each sample was ejected into separate wells of a standard 96 well plate. Lyophilized DNase Alert Substrate was dissolved in TE buffer (1 ml) and dispensed (10 μl) into the test wells of the 96-well plate. 10× DNase Alert Buffer (10 μl) and nuclease-free water (80 μl) was added and the test solution (100 μl) incubated for 60 minutes at 37° C. The DNase Alert QC System Substrate is a modified DNA oligonucleotide that emits a pink fluorescence when cleaved by DNase. For this assay, fluorescence was measured on a Tecan Ultra (excitation/emission 535/595 nm using medium gain). Solutions containing DNase produced a pink fluorescence, whereas solutions without DNase activity did not fluoresce. Thus, higher levels of DNase corresponded to an increase in the amount of light output. Negative controls consisted of nuclease-free water (80 μl) in place of sample.

Detection of RNase was carried out as follows using a cleavable fluorescent-labelled RNase substrate. Pieces of sample holding material were each ejected into separate wells of 96-well plates. Lyophilized RNase Alert Substrate was dissolved in TE buffer (1 ml) and dispensed (10 μl) into the test wells of the 96-well plate. 10× RNase Alert Buffer (10 μl) and nuclease-free water (80 μl) was added and the test solution (100 μl) incubated for 60 minutes at 37° C. The RNase Alert QC System Substrate is a modified RNA oligonucleotide that emits a green fluorescence when cleaved by RNase. For this assay, fluorescence was measured on a Tecan Ultra (excitation/emission 485/535 nm using medium gain). Solutions containing RNase produced a green fluorescence, whereas solutions without RNase activity did not fluoresce. Thus, higher levels of RNase corresponded to an increase in the amount of light output. Negative controls consisted of nuclease-free water (80 μl) in place of sample. The results of enzyme activity recovered from the 903 solid supports are shown in Table 1. The data shows significant amount of enzyme activity was recovered from native enzyme, cells and cells plus enzyme applied to the solid support, indicating that this matrix provides a suitable reagent storage medium for the device outlined in this specification.

TABLE 1

| Recovery of enzymes from uncoated 903 cards. Data is shown as mean relative fluorescence units as an indicator of enzyme activity | | | | |
|---|---|---|---|---|
| Target Reagent/Sample | Native Enzyme | Cells | Enzyme + cells | Blank |
| DNase | 41542 | 19979 | 43338 | 791 |
| RNase | 43658 | 11799 | 19795 | 342 |

Example 4

Recovery of Protein

Recombinant IL-2±carrier (R & D Systems; Cat. 202-IL-CF-10 μg; lot AE4309112 and Cat. 202-IL-10 μg; lot AE4309081 respectively) was dissolved in blood (TCS Biosciences) at 50 pg or 100 pg/μl.

Aliquots (1 μl containing 0, 50 or 100 pg of IL-2) were applied to numerous GE Healthcare filter papers (903 Neonatal STD cards Cat. 10538069, lot 6833909-W082), which were coated according to the first column of Table 2 below.

These samples were allowed to dry overnight at ambient temperature and humidity. 3 mm diameter disks of material were extracted from each paper type. Single disks were placed into individual wells of the IL-2 microplate derived from the Human IL-2 Quantikine ELISA (R & D Systems, Cat. D0250, lot 273275). These plates are coated with a mouse monoclonal antibody against IL-2. The IL-2 protein was eluted from the disk using the assay buffer (100 μl) supplied with the Quantikine kit. All subsequent steps were performed according to the instructions supplied with the Quantikine kit. On completion of the assay the optical density of the microplate was monitored at 450 nm using a Thermo Electron Corporation, Multiskan Ascent. The recovery of IL-2 was determined by comparing values to a standard curve of known IL-2 concentrations. A fresh IL-2 standard curve was prepared for each individual experiment. The results of protein recovered from the 903 solid supports are shown in Table 2. The data shows significant amount of protein was recovered from the solid support, indicating that this matrix is suitable as a reagent or protein storage medium for the device outlined in this specification and that coating the support increases the recovery of materials placed on the support.

TABLE 2

| Recovery of protein from coated cards. Data is shown as mean recovery of interleukin 2 | |
|---|---|
| 903 cellulose paper plus a coating | Percent Reagent/Sample Recovery (Interleukin-2) |
| Uncoated card (903) | 45.9 |
| Poly-2-ethyl-2-oxazoline (PeOX) | 72.0 |
| Polyvinyl pyrolodine (PVP) | 74.7 |
| Polyvinyl pyrolodine plus non-ionic detergent Polysorbate 20 (Tween 20) | 79.3 |
| Polyvinyl pyrolodine plus albumin | 82.7 |
| Poly vinyl alcohol (PVA) | 58.9 |
| PeOX plus Polysorbate 20 | 80.9 |
| Polyethylenemine (PEI) plus albumin | 75.8 |
| Polysorbate 20 plus albumin | 92.0 |

Sample or reagent stabilising mixtures may be comprised of materials applied singly or in combination. Suitable chemical or chemical mixtures are: vinyl polymer (e.g. PVA); a non-ionic detergent (e.g. Polysorbate 20 [Tween 20]); vinyl polymer and protein; non-ionic synthetic polymer (poly-2-ethyl-2-oxazoline (PEOX) and non-ionic detergent; non-ionic synthetic polymer and protein; polyethylenemine (PEI) and non-ionic detergent; non-ionic detergent and protein; and polyethylenemine (PEI) and protein.

Reagents may be stored in a dried state on the support, but in addition may be stored in a dried or stabilised state on the surface 150 (FIG. 1) of the microfluidic device. Samples are processed on board the microfluidic device, such processing including separation of proteins using magnetic ion exchange beads or using magnetic silica for the preparation of nucleic acids.

Whilst 4 different assays have been described above, it will be apparent to the skilled addressee that the apparatus and device described above have wide applicability, for example, they could be employed in the following assays:

1) Cell-based assays e.g: cell purification/sorting; cellular assays; stem cell differentiation; cardiac/hepatocyte differentiation; generation of cell clones; vector generation; transfection clonal selection; generation of labelled antibodies; single cell genomic amplification
2) Generic assays e.g: enzyme-linked immunosorbent assays, lateral flow assays, toxicological assays; single cell gel electrophoresis assays; enzymatic assays; cellular lysis; protein purification enzymatic assays;
3) Protein processes e.g: protein interactions; protein conjugation; protein-labelling; protein/peptide synthesis; sequential addition of amino acids; in-vitro troponin T protein expression; sequential protein purification; ion exchange; precipitation; antibody-based purification; recombinant protein purification; monitoring vaccine/protein production;
4) Nucleic acids processes e.g: nucleic acid synthesis; sequential addition of oligonucleotides; molecular biology manipulation (e.g enzyme digests, ligations); nucleic acid purification (e.g. DNA, tRNA, mRNA, cDNA, mtDNA); all-in-one nucleic acid labelling; generation of phage display libraries;
5) Human Identification and forensics e.g: DNA purification to STR/SNP analysis; FTA/FTA Elute and & indirect nucleic acid/protein operations; processing of sexual assault samples; and/or
6) Diagnostics e.g: neonatal screening; immunocytochemistry; genotyping; identification of infectious diseases; genetic screening; assessments of disease predisposition;

There are a number of objectives in reducing the size/volume of known assay techniques to be compatible with microfluidic devices and the apparatus described above: (1) A reduction in the costs of biological materials consumed and the manufacturing processes resulting in cost-saving to the customer and to the business; (2) Integration of all the assay or sample processing steps (including sample preparation, handling or manipulation of analysis data, result preparation) which is essential in modern laboratory environments resulting in simplified operations; (3) Ease of use in field situations allowing for mobility; (4) Capability for multiple simultaneous testing (mulitiplexing) for many different analytes or analyses for example in multiple PCR approaches which can be done using TaqMan probes or spatial PCR, in proteomic studies or in multi-readout immunoassays; (5) Reduction in hazardous solid and liquid waste and packaging will result in a positive impact for the environment; (6) Elimination manual pipetting, reagent handling, reaction/process preparation and physical transfer of samples between equipment which consumes the majority of researchers' time; (7) The device and methods described here will change the way laboratory's work and will result in simplification of workflows and remove hands on requirements; (8) The technology described in this disclosure will offer flexible handling technology potentially eliminating pipetting and will provide alternatives to other common processes such as centrifugation, mixing purification & electrophoresis.

The invention claimed is:

1. A reagent and biological sample supply apparatus for supplying a microfluidic device, the reagent and biological sample supply apparatus comprising:

a solid support formed from a material being solid and generally non-soluble, the solid support having a surface impregnated with chemicals, the chemicals including a weak base, a chelating agent, an anionic surfactant, or a chaotropic agent;

a plurality of individual aliquots being regularly spaced apart of at least one reagent being generally dry and comprising oligonucleotide primers stored on the surface of the solid support at a reagent location or locations; and a peel-off film applied to both sides of the support;

the solid support further being suitable for storing a biological sample in a dry state at a sample location or locations on a same surface of the solid support as the reagent location or locations, spaced from the reagent location or locations, wherein said material has a porosity which allows:

a first liquid flow through the material from the reagent location or locations on the surface on which the reagent is stored to an opposite side and which is configured to filter liquid containing dissolved or suspended reagent from at least one individual aliquot of the plurality of individual aliquots in response to the first liquid flow through the material of the solid support, and a second liquid flow, spaced from the first liquid flow, through the material of the solid support from the sample location or locations on the surface on which the biological sample is stored to the opposite side and which is configured to filter liquid containing an extract dissolved or suspended from the stored biological sample in response to the second liquid flow through the material of the solid support, and wherein said at least one generally dry reagent is suitable for performing an assay on biological sample recovered from the solid support by contact of the reagent from the first liquid flow with the extract from the second liquid flow.

2. The apparatus as claimed in claim 1, wherein the solid support is fibrous.

3. The apparatus as claimed in claim 1, wherein the solid support is a porous polymer.

4. The apparatus as claimed in claim 1, wherein the solid support is generally planar and includes a peripheral supporting frame, for example formed from card or plastics sheet.

5. The apparatus as claimed in claim 4, wherein the apparatus is a flat rectilinear formation.

6. The apparatus as claimed in claim 4, wherein the apparatus is a rotatable disk.

7. The apparatus as claimed in claim 4, wherein at least one depression or dimple is formed in the planar material, for example formed by embossing.

8. The apparatus as claimed in claim 1, wherein the solid support includes multiple locations, arranged as an orthogonal matrix, or a circular array.

9. The apparatus as claimed in claim 1, wherein the at least one reagent is deposited on the support in a solution carried in a liquid excipient and then dried in situ, applied pre-dried to the support, or held in place using adhesive.

10. The apparatus as claimed in claim 9, wherein the at least one reagent in solution is lyophilised.

11. The apparatus as claimed in claim 1, wherein the chemicals include each of a weak base, a chelating agent, an anionic surfactant, and a chaotropic agent.

12. The apparatus as claimed in claim 1, wherein the solid support is coated with one or more materials to enhance recovery of the extract of the biological sample material or reagent.

13. The apparatus as claimed in claim 12, wherein said one or more materials to enhance recovery include: Poly-2-ethyl-2-oxazoline (PeOX); Polyvinyl pyrolodine (PVP); Polyvinyl pyrolodine plus non-ionic detergent; Polyvinyl pyrolodine plus albumin; Poly vinyl alcohol (PVA); PeOX plus non-ionic detergent; Polyethylenemine (PEI) plus albumin; or non-ionic detergent plus albumin.

14. The apparatus as claimed in claim 1, wherein the solid support includes the biological sample, wherein the biological sample comprises i) endogenous moieties; ii) biopharmaceutical or biotech drugs or other pharmaceutical agents; (iii) nucleic acids; (iv) peptides, proteins or antibodies; or v) cells or tissue.

15. The apparatus as claimed in claim 1, wherein the solid support includes the biological sample, wherein the biological sample comprises a dried form of: blood; blood plasma, or other blood components; urine; cerebral culture media; cell samples; cell culture; or tissue exudate.

16. A microfluidic device including the reagent and biological supply apparatus according to claim 1, said reagent and biological supply apparatus holding the at least one reagent at the reagent location or locations, and a dried form of the biological sample at the sample location or locations.

17. The microfluidic device as claimed in claim 16, further including:

a liquid dispenser for dissolving selected one or more aliquots of the plurality of individual aliquots of the at least one dry reagent to generate at least one dissolved reagent; and a liquid transporter for transporting at least one dissolved reagent from said solid support to said microfluidic device.

18. A microfluidic system comprising:

a microfluidic device defining openings;

a first mount carrying a plurality of individual aliquots of reagents in a substantially dry form comprising oligonucleotide primers;

a second mount separate from the first mount suitable for dry storing a biological sample; and a respective peel-off film applied to both sides of the solid support, wherein the microfluidic device includes a first mount receiving area for receiving the first mount and a second mount receiving area for receiving the second mount, and a liquid path from the first and second mount receiving areas to a liquid processing area, wherein the first mount and the second mount each comprise a solid support formed from a solid fibrous material being generally non-soluble, the solid support having a surface impregnated with chemicals, the chemicals including a weak base, a chelating agent, an anionic surfactant, or a chaotropic agent, wherein the first mount receiving area is spaced from the second mount receiving area, wherein the openings of the microfluidic device are aligned with the plurality of individual aliquots of reagents, and wherein the first mount carries at least two reagents, and where the at least two reagents are present in separate aliquots of the plurality of individual aliquots in separate areas of the first mount.

19. The microfluidic system of claim 18, wherein the plurality of individual aliquots of the at least one reagent are stored on a surface of the solid fibrous material at a reagent location or locations, wherein said solid fibrous material has a porosity which allows liquid flow through the solid fibrous material from the surface on which the at least one reagent is stored to an opposite side through the liquid path, and wherein the solid fibrous material is configured to filter liquid containing dissolved or suspended reagent in response to the liquid flow through the solid fibrous material.

20. The reagent and biological sample supply apparatus system of claim 1, wherein the solid support carries at least two reagents, and where the at least two reagents are present in separate aliquots of the plurality of individual aliquots in separate areas of the solid support.

* * * * *